United States Patent
Ko et al.

(10) Patent No.: US 8,179,949 B2
(45) Date of Patent: May 15, 2012

(54) CORRELATION METHOD AND SIGNAL PROCESSING METHOD OF CDMA RECEIVER USING MAPPING

(75) Inventors: Sun Jun Ko, Gyunggi-Do (KR); Sung Hyuck Im, Seoul (KR); Gyu In Jee, Seoul (KR); Hak Sun Kim, Daejeon (KR); Sang Do Cho, Gyunggi-Do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 1419 days.

(21) Appl. No.: 11/740,412

(22) Filed: Apr. 26, 2007

(65) Prior Publication Data

US 2008/0123784 A1 May 29, 2008

(30) Foreign Application Priority Data

Nov. 24, 2006 (KR) .................. 10-2006-0117238

(51) Int. Cl.
  *H04B 1/707* (2006.01)
  *H04L 27/06* (2006.01)
(52) U.S. Cl. ..................... 375/149; 375/343
(58) Field of Classification Search .............. 375/134, 375/137, 142, 143, 145, 149, 150, 152, 260, 375/343; 370/208, 210, 320, 335, 342
See application file for complete search history.

(56) References Cited

U.S. PATENT DOCUMENTS

| | | | |
|---|---|---|---|
| 5,134,407 A * | 7/1992 | Lorenz et al. | 342/352 |
| 5,535,278 A * | 7/1996 | Cahn et al. | 380/274 |
| 5,953,367 A * | 9/1999 | Zhodzicshsky et al. | 375/147 |
| 6,125,135 A * | 9/2000 | Woo et al. | 375/130 |
| 6,160,841 A * | 12/2000 | Stansell et al. | 375/148 |
| 7,010,060 B2 | 3/2006 | Ledvina et al. | |
| 2006/0227856 A1 | 10/2006 | Ledvina et al. | |
| 2007/0058700 A1* | 3/2007 | Fenton | 375/150 |

FOREIGN PATENT DOCUMENTS

| | | |
|---|---|---|
| EP | 1 047 201 A2 | 10/2000 |
| JP | 2675965 B2 | 11/1997 |
| JP | 3609672 B2 | 1/2005 |
| WO | 99/17221 A1 | 4/1999 |
| WO | 01/09364 A2 | 2/2001 |

OTHER PUBLICATIONS

Japanese Office Action for application No. 2007-121740, mailed Mar. 2, 2010.
UK Intellectual Property Office Search Report, mailed Aug. 15, 2007.
German Patent Office Office Action and English Translation, 2009.

* cited by examiner

*Primary Examiner* — Young T. Tse
(74) *Attorney, Agent, or Firm* — Lowe, Hauptman, Ham & Berner, LLP (57) ABSTRACT

A correlation method of a code division multiple access receiver using mapping. Digital data with each signal composed of two bits are packed by a predetermined packing unit; blocking the packed data into data blocks according to a size corresponding to the repetition period of a C/A code. The packed data are recognized as an index in a correlation value mapping table having ICV and QCV mapped with each of different indexes and the ICV and the QCV are called from the correlation value mapping table. The called ICV and QCV are integrated according to the data blocks; and calculating a phase error of a carrier wave and a phase error of the C/A code using the ICV and the QCV according to the data blocks. A signal processing method is performed using the correlation method to correct phase errors.

12 Claims, 7 Drawing Sheets

CORRELATION METHOD AND SIGNAL PROCESSING METHOD OF CDMA RECEIVER USING MAPPING

CLAIM OF PRIORITY

This application claims the benefit of Korean Patent Application No. 2006-117238 filed on Nov. 24, 2006, in the Korean Intellectual Property Office, the disclosure of which is incorporated herein by reference.

BACKGROUND OF THE INVENTION

1. Field of the Invention

The present invention relates to a correlation method applicable to a Code Division Multiple Access (CDMA) receiver, and more particularly, to a correlation method and a signal processing method of a CDMA receiver using mapping which can call In-phase (I) and Quadrature-phase (Q) correlation values to be mapped to digital data, in real-time, by using a prepared correlation value mapping table in order to reduce code calculation significantly, thereby enabling high speed processing.

2. Description of the Related Art

In general, a Global Positioning System (GPS) receiver serves to receive time and position information from GPS satellites. The GPS receiver should correctly compensate phase errors of carrier waves and Coarse/Acquisition (C/A) codes based on received signals and predetermined signals in order to correctly acquire the information received in GPS signals.

Figure 1:
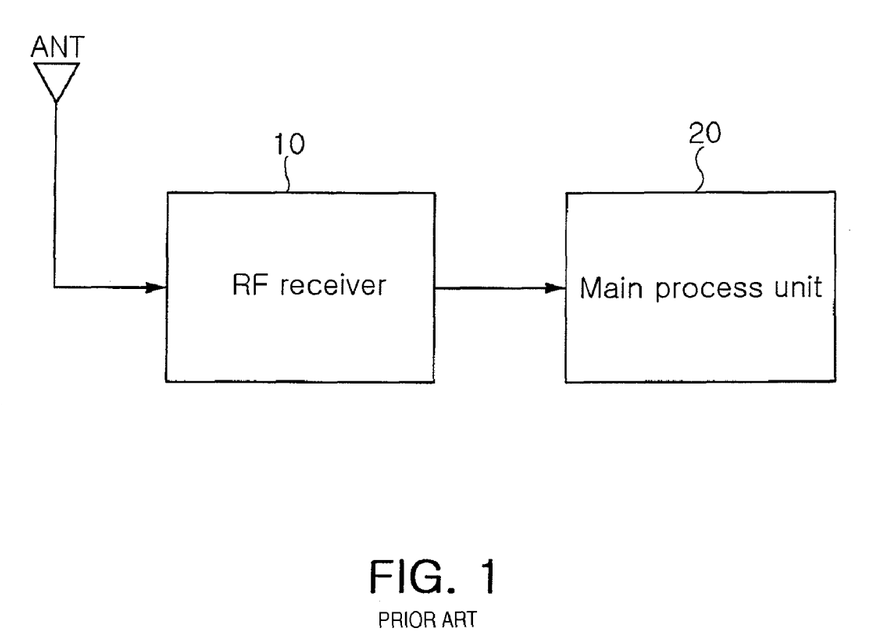
FIG. 1 is a block diagram illustrating a typical GPS receiver.

FIG. 1 is a block diagram illustrating a typical GPS receiver.

Referring to FIG. 1, the GPS receiver includes a Radio Frequency (RF) receiver 10 for receiving GPS signals through an antenna ANT and converting the GPS signals into Intermediate Frequency (IF) signals and a Main Process Unit (MPU) 20 for extracting satellite data from the IF signals received from the RF receiver 10.

As means for acquiring GPS information, the MPU 20 includes a correlator that produces the correlation value between a digital IF signal and a reference signal. Such a correlator will be described with reference to FIG. 2 as follows.

Figure 2:
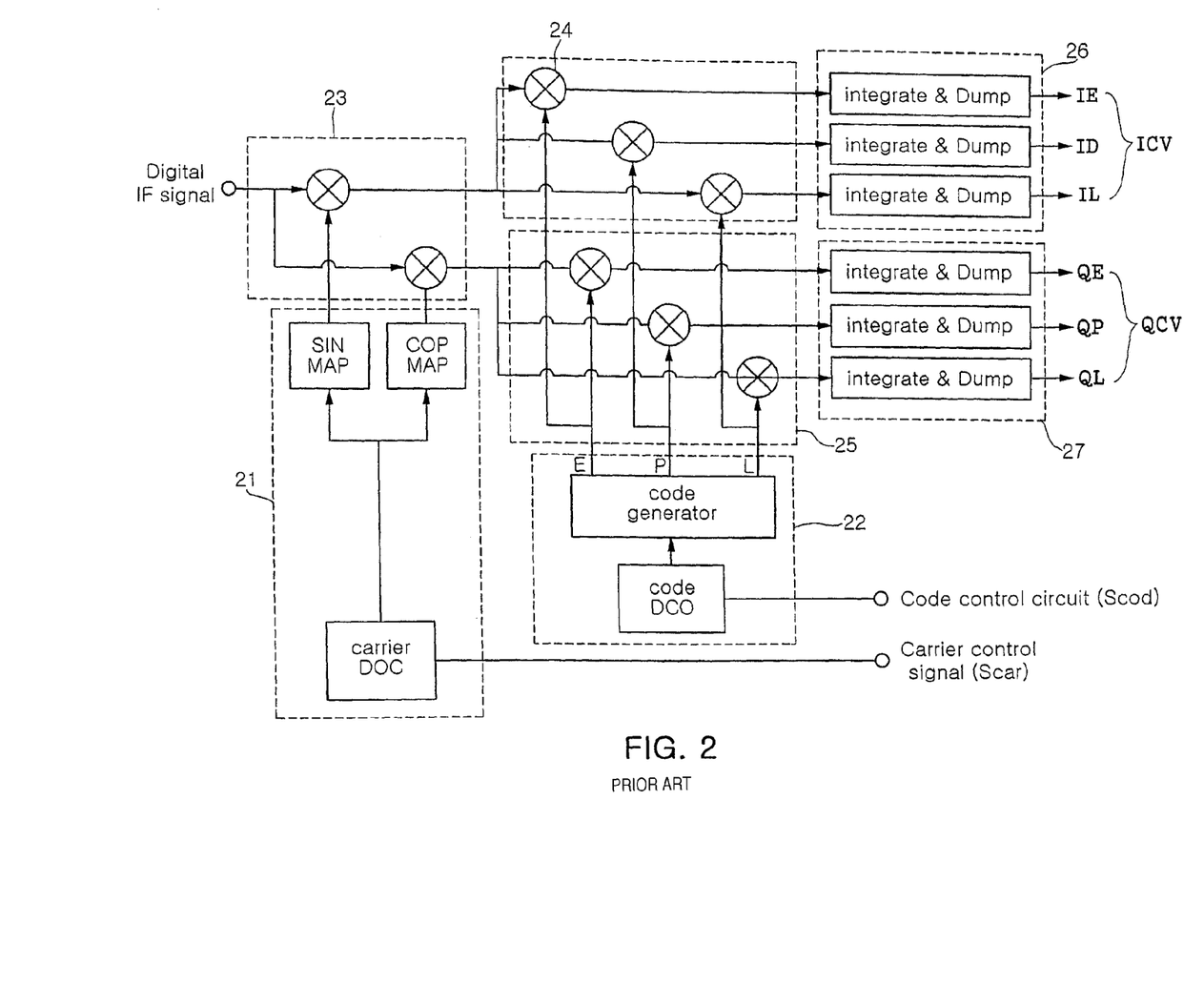
FIG. 2 is a block diagram illustrating a correlator of a GPS receiver of the related art.

FIG. 2 is a block diagram illustrating a correlator of a GPS receiver of the related art.

As shown in FIG. 2, the correlator of the GPS receiver of the related art includes a carrier wave generator 21, a code generator 22, a carrier mixer 23, an I code mixer 24, a Q code mixer 25, an I integrator 26 and a Q integrator 27. The carrier wave generator 21 generates a carrier wave signal in response to a carrier wave control signal Scar, and the code generator 22 generates a C/A code in response to the code control signal. The carrier mixer 23 divides a digital signal of about 16 MHz into I and Q signals and mixes the I and Q signals with the carrier wave signal from the carrier wave generator 21 to produce I and Q baseband signals of about 2 MHz, respectively. The I code mixer 24 mixes the I baseband signal from the carrier mixer 23 with the code from the code generator 22 to produce individual I Correlation Value (ICV), and the Q code mixer 24 mixes the Q baseband signal from the carrier mixer 23 with the code from the code generator 22 to produce individual Q Correlation Value (QCV). The I integrator 26 integrates the individual ICV received from the I code mixer 24, and the Q integrator 27 integrates the individual QCV received from the Q code mixer 25.

Here, the I integrator 26 outputs the ICV including an I Prompt (IP) value in the present prompt, an I Early (IE) value in a half-chip early code and an I Late (IL) value in a half-chip late code.

In addition, the Q integrator 27 outputs the QCV including a Q Prompt (QP) value in the present prompt, a Q Early (QE) value in a half-chip early code and a Q Late (QL) value in a half-chip late code.

Since the correlator of the GPS receiver is composed of a hardware, the C/A codes set inside the correlator are different according to terminals and thus the correlators should be realized in different versions according to the terminals.

Accordingly, one type of hardware correlator is not used in different types of terminals, causing a problem of poor applicability.

Although a software correlator can be realized in order to alleviate the problem of the hardware correlator, real-time signal processing is impossible due to massive amount of data to be calculated.

SUMMARY OF THE INVENTION

The present invention has been made to solve the foregoing problems of the related art and therefore an aspect of certain embodiments of the present invention is to provide a correlation method and a signal processing method of a CDMA receiver using mapping which can call ICV and QCV to be mapped to digital data, in real-time, by using a prepared correlation value mapping table in order to reduce code calculation significantly, thereby enabling high speed processing.

According to an aspect of the invention, the invention provides a correlation method of a code division multiple access receiver using mapping, comprising: packing digital data with each signal composed of two bits by a predetermined packing unit; blocking the packed data into data blocks according to a size corresponding to the repetition period of a C/A code; recognizing the packed data as an index in a correlation value mapping table having ICV and QCV mapped with each of different indexes and calling the ICV and the QCV from the correlation value mapping table; integrating the called ICV and the QCV according to the data blocks; and calculating a phase error of a carrier wave and a phase error of the C/A code using the ICV and the QCV according to the data blocks.

Preferably, in the data packing step, the packing unit of the packed digital data may be two bytes including eight digital data.

Preferably, the repetition period of the C/A code is about 1 mS.

The correlation value calling step may comprise: calling the index mapped to the packed data from the index mapping table which contains the index mapped to the packed data; and calling the ICV and the QCV mapped to the called index from the correlation value mapping table which contains the ICV and the QCV mapped to the index.

The correlation value calling step may further comprise: correcting the index called in the index calling step by a code inversion phase difference.

Preferably, the phase error of the carrier wave in the error calculating step is produced using the ICV and the QCV as expressed in a following equation:

$$Err1 = TAN^{-1}(QCV/ICV),$$

where Err1 is the phase error of the carrier wave.

According to an aspect of the invention, the invention provides a signal processing method of a code division multiple access receiver using mapping, comprising: packing digital data with each signal composed of two bits by a predetermined packing unit; blocking the packed data into data blocks according to a size corresponding to the repetition period of a C/A code; recognizing the packed data as an index in a correlation value mapping table having ICV and QCV mapped with each of different indexes and calling the ICV and the QCV from the correlation value mapping table; integrating the called ICV and the QCV according to the data blocks in; calculating a phase error of a carrier wave and a phase error of the C/A code using the ICV and the QCV according to the data blocks; and removing the phase error of the carrier wave of the digital data by using a phase locked loop and removing the phase error of the C/A code of the digital data by using a delay locked loop.

Preferably, in the data packing step, the packing unit of the packed digital data may be two bytes including eight digital data.

Preferably, the repetition period of the C/A code is about 1 mS.

The correlation value calling step may comprise: calling the index mapped to the packed data from the index mapping table which contains the index mapped to the packed data; and calling the ICV and the QCV mapped to the called index from the correlation value mapping table which contains the ICV and the QCV mapped to the index.

The correlation value calling step may further comprise: correcting the index called in the index calling step by a code inversion phase difference.

Preferably, the phase error of the carrier wave in the error calculating step is produced using the ICV and the QCV as expressed in a following equation:

$$Err1 = TAN^{-1}(QCV/ICV),$$

where Err1 is the phase error of the carrier wave.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

The present invention will now be described more fully hereinafter with reference to the accompanying drawings, in which preferred embodiments of the invention are shown.

The invention should not be construed as limited to the embodiments set forth herein, but these embodiments are provided so that this disclosure will be thorough and complete, and will fully convey the scope of the invention to those skilled in the art. In the drawings, the same or similar reference numerals are used to designate the like components throughout.

Figure 3:
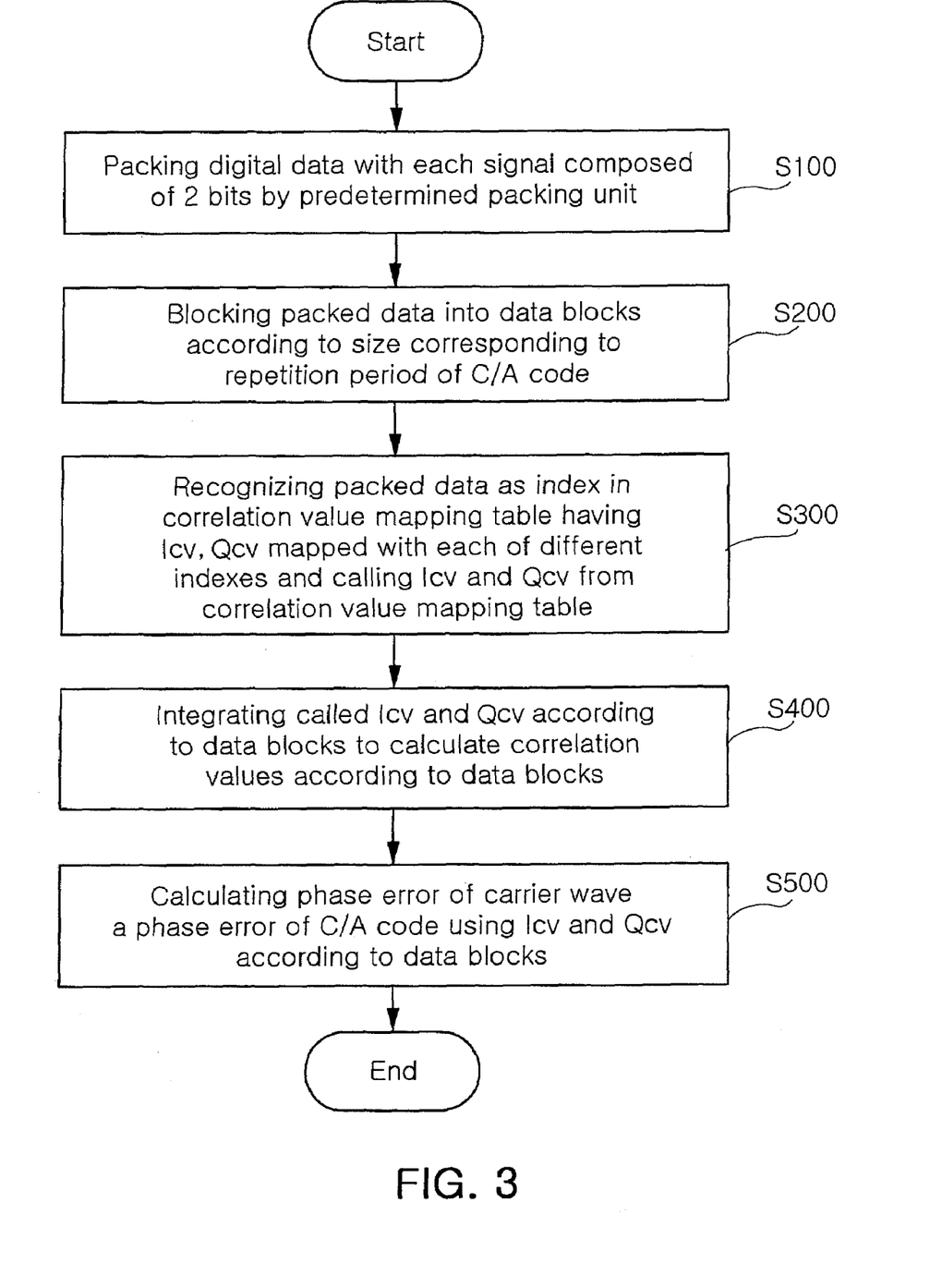
FIG. 3 is a flowchart illustrating a correlation method of a CDMA receiver using mapping according to an embodiment of the invention.

FIG. 3 is a flowchart illustrating a correlation method of a CDMA receiver using mapping according to an embodiment of the invention.

Referring to FIG. 3, the correlation method by using the mapping of the CDMA receiver of this embodiment carries out steps of: packing digital data with each signal composed of two (2) bits by a predetermined packing unit in S100; blocking the packed data into data blocks according to a size corresponding to the repetition period of a C/A code in S200; recognizing the packed data as an index in a correlation value mapping table having I and Q correlation values (ICV, QCV) mapped with each of different indexes and calling the ICV and the QCV from the correlation value mapping table in S300; integrating the called ICV and the QCV according to the data blocks in S400; and calculating a phase error of a carrier wave and a phase error of the C/A code using the ICV and the QCV according to the data blocks in S500.

Figure 4:
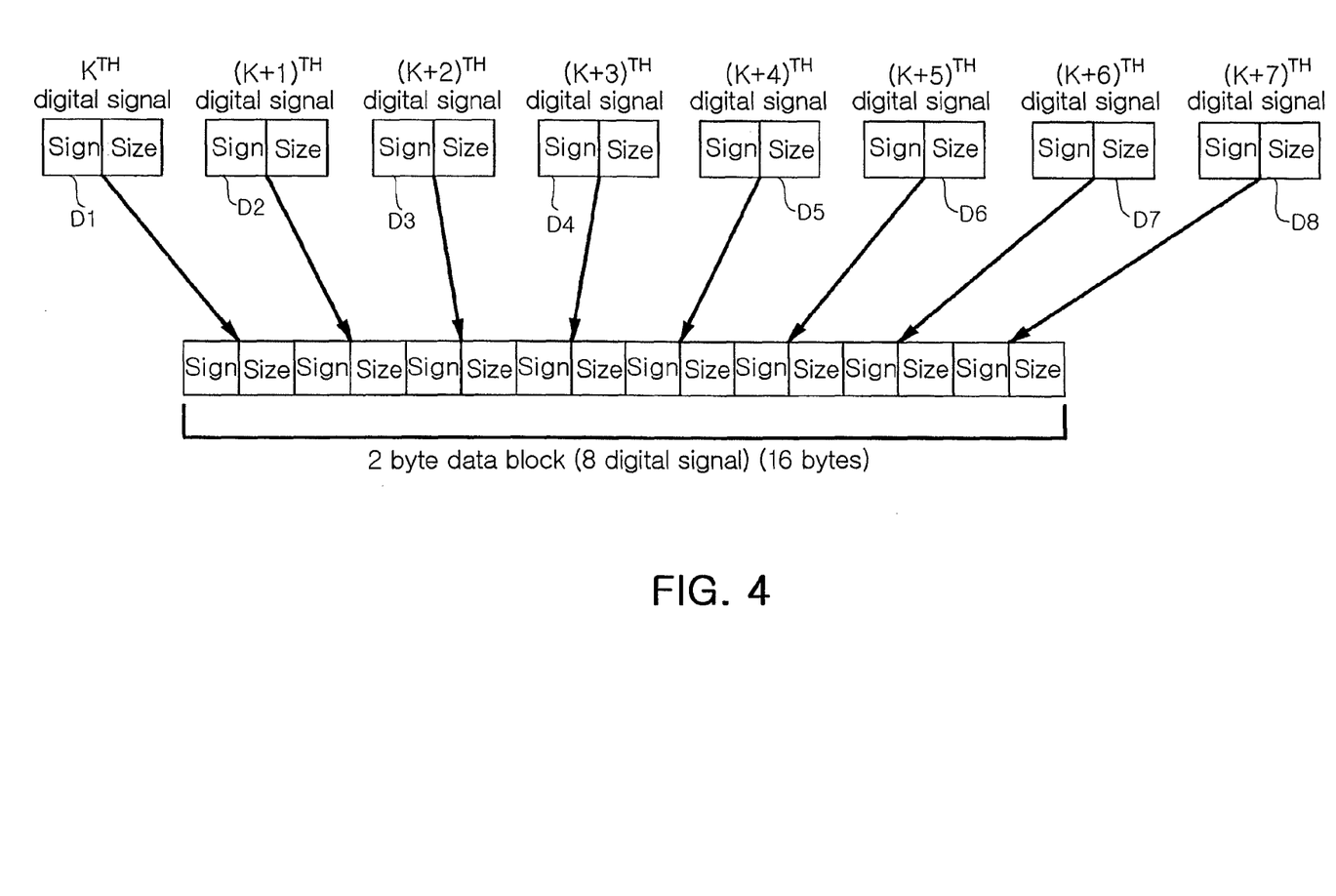
FIG. 4 is a structural view illustrating the data packed in the method shown in FIG. 3.

FIG. 4 is a structural view illustrating the data packed in the method shown in FIG. 3.

Referring to FIG. 4, the packing unit of the packed digital data may be two (2) bytes including eight (8) digital data.

For example, digital data of 20 bytes are packed into 10 data packets by the packing unit of 2 bytes including 8 digital data.

Figure 5:
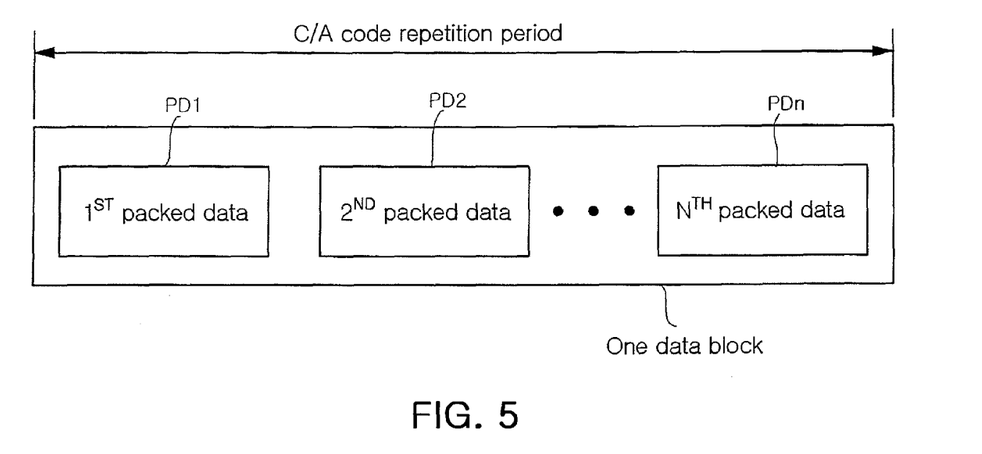
FIG. 5 is a structural view illustrating one of the data blocks used in the method shown in FIG. 3.

FIG. 5 is a structural view illustrating one of the data blocks used in the method shown in FIG. 3.

Referring to FIG. 5, the data block may include a first packed data PD1, a second packed data PD2, . . . and an $n^{th}$ packed data PDn.

The data blocks are blocked by the repetition period of the C/A code that is about 1 mS. With a sampling frequency of 16.367 MHz, each of the data blocks corresponds to 4,092 bytes.

Figure 6:
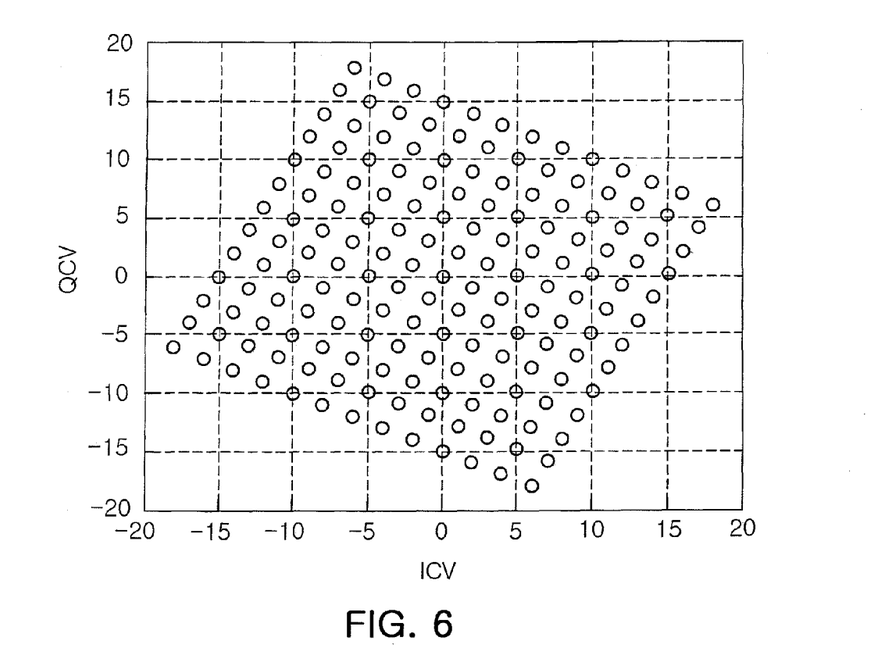
FIG. 6 is a graph illustrating the relationship between the ICV and the QCV set in the correlation mapping table used in the method shown in FIG. 3.

FIG. 6 is a graph illustrating the relationship 20 between the ICV and the QCV set in the correlation mapping table used in the method shown in FIG. 3.

Referring to FIG. 6, the ICV and the QCV are paired, mapped in the packing data, and prepared in the table.

Figure 7:
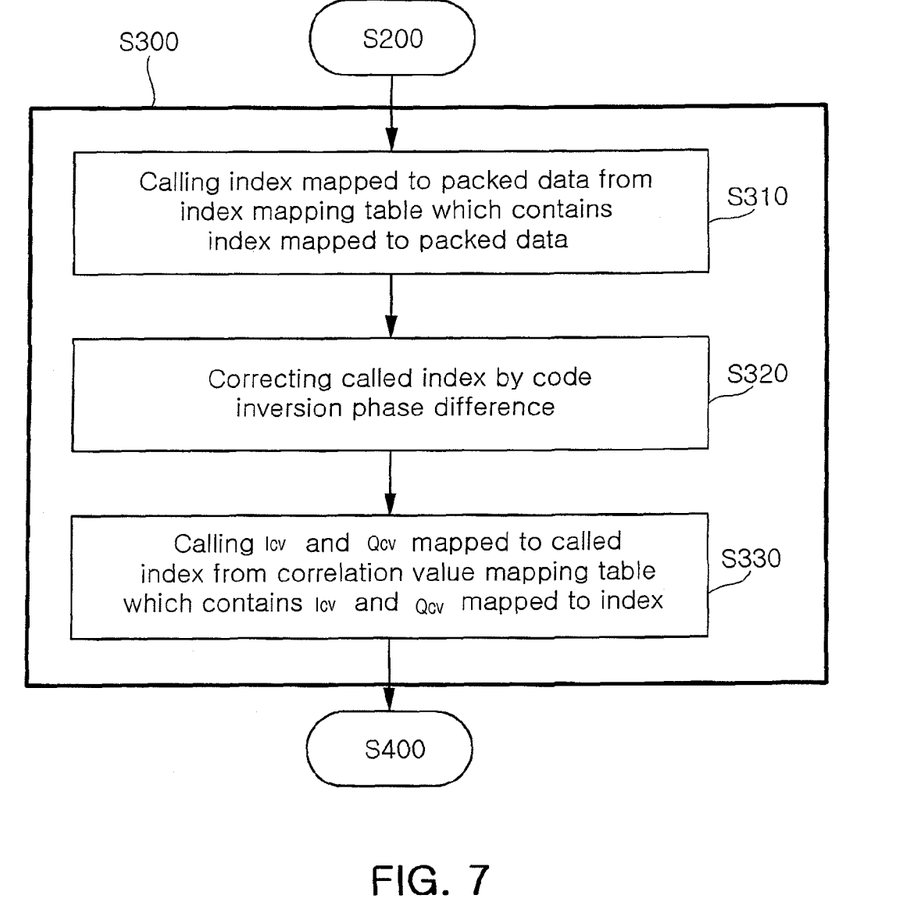
FIG. 7 is a flowchart illustrating the correlation value calling procedure in the method shown in FIG. 3.

FIG. 7 is a flowchart illustrating the correlation value calling procedure in the method shown in FIG. 3.

Referring to FIG. 7, the correlation value calling step S300 carries out calling the index mapped to the packed data from the index mapping table which contains the index mapped to the packed data in S310; and calling the ICV and the QCV mapped to the index, which is called in the step S310, from the correlation value mapping table which contains the ICV and the QCV mapped to the index in S330.

The correlation value calling step may also carry out correcting the index called in the index calling step S310 by a code inversion phase difference in S320.

The phase error of the carrier wave Err1 in the error calculating step S500 is produced using the ICV and the QCV as expressed in the following Equation:

$$Err1 = TAN^{-1}(QCV/ICV).$$

Figure 8:
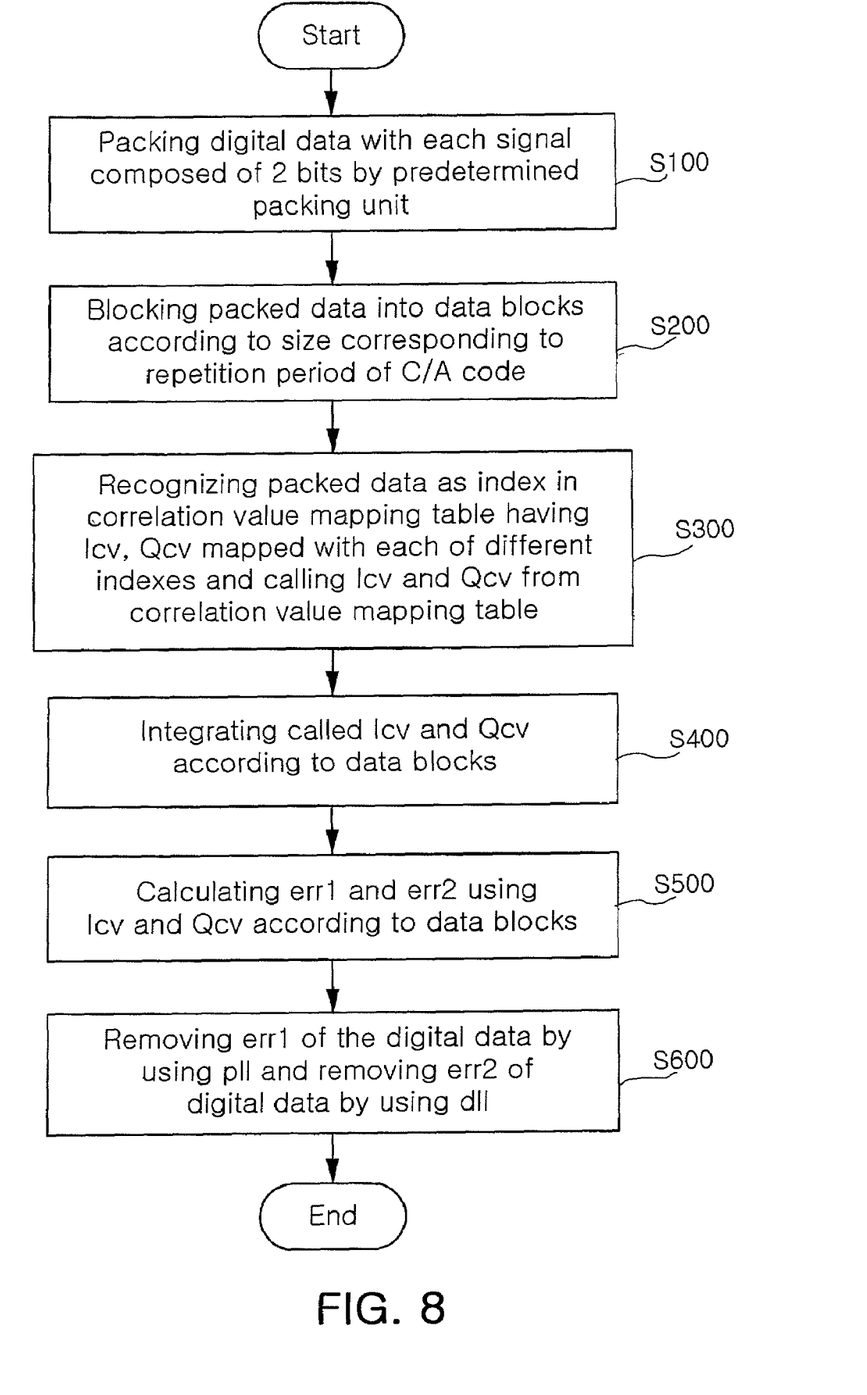
FIG. 8 is a flowchart illustrating a signal processing method of a CDMA receiver according to another embodiment of the invention.

FIG. 8 is a flowchart illustrating a signal processing method of a CDMA receiver according to another embodiment of the invention.

Referring to FIG. 8, the signal processing method of the CDMA receiver according to this embodiment includes steps of: packing digital data with each signal composed of two (2) bits by a predetermined packing unit in S100; blocking the packed data into data blocks according to a size corresponding to the repetition period of a C/A code in S200; recognizing the packed data as an index in a correlation value mapping table having I and Q correlation values (ICV, QCV) mapped with each of different indexes and calling the ICV and the QCV from the correlation value mapping table in S300; integrating the called ICV and the QCV according to the data blocks in S400; calculating a phase error of a carrier wave Err1 and a phase error of the C/A code Err2 using the ICV and the QCV according to the data blocks in S500; and removing the phase error of the carrier wave of the digital data by using a Phase Locked Loop (PLL) and removing the phase error of the C/A code of the digital data by using a Delay Locked Loop (DLL) in S600.

In the data packing step S100, the packing unit of the packed digital data is two (2) bytes including eight (8) digital data.

The repetition period of the C/A code may be set to be about 1 mS.

The correlation value calling step S300 carries out calling the index mapped to the packed data from the index mapping table which contains the index mapped to the packed data in S310; and calling the ICV and the QCV mapped to the index, which is called in the step S310, from the correlation value mapping table which contains the ICV and the QCV mapped to the index in S330.

The correlation value calling step may also carries out correcting the index called in the index calling step S310 by a code inversion phase difference in S320.

The phase error of the carrier wave Err1 in the error calculating step S500 is produced using the ICV and the QCV as expressed in the equation of $Err1=TAN^{-1}(QCV/ICV)$.

Now the operation and effect of the invention will be described in detail with reference to the attached drawings.

Describing the correlation method of a code division multiple access receiver using mapping according to an embodiment of the invention with reference to FIGS. 3 to 8, the data packing step S100 is performed to pack digital data with each signal composed of 2 bits by a predetermined packing unit and forward the packed data to the data blocking step S200.

Referring to FIG. 4, the packing unit of the packed digital data is 2 bytes including 8 digital data, and digital data of 20 bytes, for example, are packed into 10 data packets by the packing unit of 2 bytes including 8 digital data.

Referring to FIG. 3 again, the data blocking step S200 is performed to block the packed data into data blocks according to a size corresponding to the repetition period of a C/A code and forward the data blocks to the correlation value calling step S300.

Referring to FIG. 5, the data block may include a first packed data PD1, a second packed data PD2, . . . and an $n^{th}$ packed data PDn.

Here, the data blocks are blocked by the repetition period of the C/A code that is about 1 mS. With a sampling frequency of 16.367 MHz, each of the data blocks corresponds to 4,092 bytes.

Referring to FIG. 3 again, the correlation value calling step S300 is performed to recognize the packed data as an index in a correlation value mapping table having ICV and QCV mapped with each of different indexes, call the ICV and the QCV from the correlation value mapping table, and then forward the ICV and the QCV to the error calculating step S500.

Referring to FIG. 6, the ICV and the QCV are paired, mapped in the packing data, and prepared in the table.

The correlation value calling step S300 will now be described with reference to FIG. 7.

As shown in FIG. 7, in a case where the correlation value calling step S300 includes the index calling step S310 and the I/Q calling step S330, the index calling step S310 is performed to call the index mapped to the packed data from the index mapping table which contains the index mapped to the packed data.

The I/Q calling step S330 is performed to call the ICV and the QCV mapped to the index, which is called in the step S310, from the correlation value mapping table which contains the ICV and the QCV mapped to the index.

The correlation value calling step may also include the index correcting step S320, which is performed to correct the index called in the index calling step S310 by a code inversion phase difference.

Referring to FIG. 3 again, the called ICV and the QCV are integrated according to the data blocks in S400; and a phase error of a carrier wave and a phase error of the C/A code are calculated using the ICV and the QCV according to the data blocks in S500.

The phase error of the carrier wave Err1 in the error calculating step S500 is produced using the ICV and the QCV as expressed in the equation of $Err1=TAN^{-1}(QCV/ICV)$.

Now the correlation method of a code division multiple access receiver using mapping according to another embodiment of the invention will be described with reference to FIG. 8.

Referring to FIG. 8, the data packing step S100 is performed to pack digital data with each signal composed of 2 bits by a predetermined packing unit and forward the packed data to the data blocking step S200.

In the data blocking step S200, the packing unit of the packed digital data is 2 bytes including 8 digital data.

The data blocking step S200 is performed to block the packed data into data blocks according to a size corresponding to the repetition period of a C/A code and forward the data blocks to the correlation value calling step S300.

The data blocks are blocked by the repetition period of the C/A code that is about 1 mS.

The correlation value calling step S300 is performed to recognize the packed data as an index in a correlation value mapping table having ICV and QCV mapped with each of different indexes, call the ICV and the QCV from the correlation value mapping table, and then forward the ICV and the QCV to the error calculating step S500.

The correlation value calling step S300 includes: calling the index mapped to the packed data from the index mapping table which contains the index mapped to the packed data in S310; and calling the ICV and the QCV mapped to the index, which is called in the step S310, from the correlation value mapping table which contains the ICV and the QCV mapped to the index in S330.

The correlation value calling step may also include the index correcting step S320, which is performed to correct the index called in the index calling step S310 by a code inversion phase difference.

The integration step S400 is performed to integrate the called ICV and the called QCV according to the data blocks and forward the integrated ICV and QCV to the error calculating step S500.

The error calculating step S500 calculates the phase error of the carrier wave Err1 and the phase error of the C/A code Err2 using the ICV and the QCV according to the data blocks and forward the calculated phase errors to the error correcting step S600.

In the error calculating step S500, the phase error of the carrier wave Err1 is calculated as expressed in the above Equation using the ICV and the QCV.

In the error correcting step S600, the phase error of the carrier wave of the digital data is removed using a PLL and removing the phase error of the C/A code of the digital data is removed by using a DLL.

As described above, an exemplary embodiment of the invention can bit-parallelize high speed correlation and remove multiplication from the existing hardware correlator structure by converting the IF signal in bit unit into blocks of 16 sample data, thereby raising calculation efficiency of about 73%.

According to a certain embodiment of the present invention as set forth above, the correlation method and the signal processing method of a CDMA receiver using mapping can call ICV and QCV to be mapped to digital data, in real-time, by using a prepared correlation value mapping table in order to reduce code calculation significantly, thereby enabling high speed processing.

That is, a software correlator capable of operating in real-time can be provided to impart high calculation ability adequate to a software GPS receiver with use for a low-price processor as well as high processing ability for standardized IF signals. Mere replacement of code maps can provide new ability of signal tracing, at a signal loss of 1 dB or less. Furthermore, in the initial parallel signaling process, the calculation amount of Fast Fourier Transform (FFT) can be reduced to 1/8.

While the present invention has been described with reference to the particular illustrative embodiments and the accompanying drawings, it is not to be limited thereto but will be defined by the appended claims. It is to be appreciated that those skilled in the art can substitute, change or modify the embodiments into various forms without departing from the scope and spirit of the present invention.

What is claimed is:

1. A correlation method of a code division multiple access receiver using mapping, comprising:
   packing digital data with each signal composed of two bits by a predetermined packing unit;
   blocking the packed data into data blocks according to a size corresponding to the repetition period of a C/A code;
   recognizing the packed data as an index in a correlation value mapping table having I and Q correlation values mapped with each of different indexes and calling the I and Q correlation values from the correlation value mapping table;
   integrating the called I correlation value and the Q correlation value according to the data blocks; and
   calculating a phase error of a carrier wave and a phase error of the C/A code using the I correlation value and the Q correlation value according to the data blocks.

2. The correlation method according to claim 1, wherein in the data packing step, the packing unit of the packed digital data is two bytes including eight digital data.

3. The correlation method according to claim 1, wherein the repetition period of the C/A code is about 1 mS.

4. The correlation method according to claim 1, wherein the packed data recognizing step comprises:
   calling the index mapped to the packed data from an index mapping table which contains the index mapped to the packed data; and
   calling the I correlation value and the Q correlation value mapped to the called index from the correlation value mapping table which contains the I correlation value and the Q correlation value mapped to the index.

5. The correlation method according to claim 4, wherein the packed data recognizing step further comprises: correcting the index called in the index calling step by a code inversion phase difference.

6. The correlation method according to claim 1, wherein the phase error of the carrier wave in the error calculating step is produced using the I correlation value, ICV, and the Q correlation value, QCV, as expressed in a following equation:

$$Err1 = TAN^{-1}(QCV/ICV),$$

where Err1 is the phase error of the carrier wave.

7. A signal processing method of a code division multiple access receiver using mapping, comprising:
   packing digital data with each signal composed of two bits by a predetermined packing unit;
   blocking the packed data into data blocks according to a size corresponding to the repetition period of a C/A code;
   recognizing the packed data as an index in a correlation value mapping table having I and Q correlation values mapped with each of different indexes and calling the I correlation value and the Q correlation value from the correlation value mapping table;
   integrating the called I correlation value and the Q correlation value according to the data blocks;
   calculating a phase error of a carrier wave and a phase error of the C/A code using the I correlation value and the Q correlation value according to the data blocks; and
   removing the phase error of the carrier wave of the digital data by using a phase locked loop and removing the phase error of the C/A code of the digital data by using a delay locked loop.

8. The signal processing method according to claim 7, wherein in the data packing step, the packing unit of the packed digital data is two bytes including eight digital data.

9. The signal processing method according to claim 7, wherein the repetition period of the C/A code is about 1 mS.

10. The signal processing method according to claim 7, wherein the packed data recognizing step comprises:
    calling the index mapped to the packed data from an index mapping table which contains the index mapped to the packed data; and
    calling the I correlation value and the Q correlation value mapped to the called index from the correlation value mapping table which contains the I correlation value and the Q correlation value mapped to the index.

11. The signal processing method according to claim 10, wherein the packed data recognizing step further comprises: correcting the index called in the index calling step by a code inversion phase difference.

12. The signal processing method according to claim 7, wherein the phase error of the carrier wave in the error calculating step is produced using the I correlation value, ICV, and the Q correlation value, QCV, as expressed in a following equation:

$$Err1 = TAN^{-1}(QCV/ICV),$$

where Err1 is the phase error of the carrier wave.

* * * * *